United States Patent
Nowak et al.

(10) Patent No.: US 10,792,585 B2
(45) Date of Patent: Oct. 6, 2020

(54) FOLDED FRACTIONATION COLUMN AND PROCESS

(71) Applicant: UOP LLC, Des Plaines, IL (US)

(72) Inventors: Brian J. Nowak, Orchard Park, NY (US); Kevin J. Richardson, Hamburg, NY (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/940,776

(22) Filed: Mar. 29, 2018

(65) Prior Publication Data

US 2019/0299118 A1 Oct. 3, 2019

(51) Int. Cl.
| | | |
|---|---|---|
| B01D 3/14 | (2006.01) | |
| B01D 3/32 | (2006.01) | |
| B01D 3/42 | (2006.01) | |
| B01D 3/10 | (2006.01) | |
| B01D 3/38 | (2006.01) | |

(52) U.S. Cl.
CPC ............. B01D 3/324 (2013.01); B01D 3/106 (2013.01); B01D 3/141 (2013.01); B01D 3/4277 (2013.01); B01D 3/14 (2013.01); B01D 3/38 (2013.01); B01D 3/4261 (2013.01); B01D 3/4283 (2013.01); B01D 3/4294 (2013.01)

(58) Field of Classification Search
CPC ........... B01D 3/14; B01D 3/141; B01D 3/143
USPC ............................................ 202/154; 203/75
See application file for complete search history.

(56) References Cited

U.S. PATENT DOCUMENTS

| | | | |
|---|---|---|---|
| 4,096,574 A | | 6/1978 | Christie |
| 4,234,391 A | * | 11/1980 | Seader .................. B01D 3/141 165/104.26 |
| 4,894,145 A | | 1/1990 | Jensen |
| 6,348,637 B1 | | 2/2002 | Harris |
| 6,483,002 B1 | | 11/2002 | O'Brien |
| 7,091,252 B2 | * | 8/2006 | Smith, Jr. .............. B01D 3/009 203/66 |
| 7,528,290 B2 | * | 5/2009 | Zimmermann ........ B01D 1/007 202/152 |
| 8,877,014 B2 | | 11/2014 | Corradi et al. |
| 9,550,133 B2 | * | 1/2017 | Favilli ..................... B01D 1/28 |
| 9,908,060 B2 | * | 3/2018 | Wakabayashi ........... B01D 1/28 |
| 2009/0114524 A1 | | 5/2009 | Sechrist |

(Continued)

FOREIGN PATENT DOCUMENTS

| | | |
|---|---|---|
| TW | 201731813 A | 9/2017 |
| WO | 2014130066 A1 | 8/2014 |

OTHER PUBLICATIONS

R.M. Price, lecture notes titled "Distillation I: Principles", 2003, available online at: http://facstaff.cbu.edu/rprice/lectures/distill.html (Year: 2003).*

(Continued)

*Primary Examiner* — Jonathan Luke Pilcher

(57) ABSTRACT

An apparatus and process doubles the number of trays in a single fractionation column. A dividing wall is used to isolate a first side from a second side and fractionation on trays on each side is independent of the other. A transition vapor stream is ducted from a top of a first side to the bottom of the second side, and a transition liquid stream is ducted from a bottom of the second side to the top of the first side.

13 Claims, 1 Drawing Sheet

(56) References Cited

U.S. PATENT DOCUMENTS

2013/0256115 A1* 10/2013 Wakabayashi ........... B01D 1/28
                                                                 202/154
2014/0158521 A1    6/2014  Ablin et al.
2019/0282920 A1    9/2019  Schon et al.

OTHER PUBLICATIONS

Mane et.al., A New Intensified Heat Integration in Distillation Column, Department of Chemical Engineering, Indian Institute of Technology—Kharagpur, West Bengal 721 302, India, Ind. Eng. Chem. Res., 2010, 49 (19), pp. 9534-9541.
International Search Report from corresponding PCT application No. PCT/US2019/024491, dated Jun. 13, 2019.

* cited by examiner

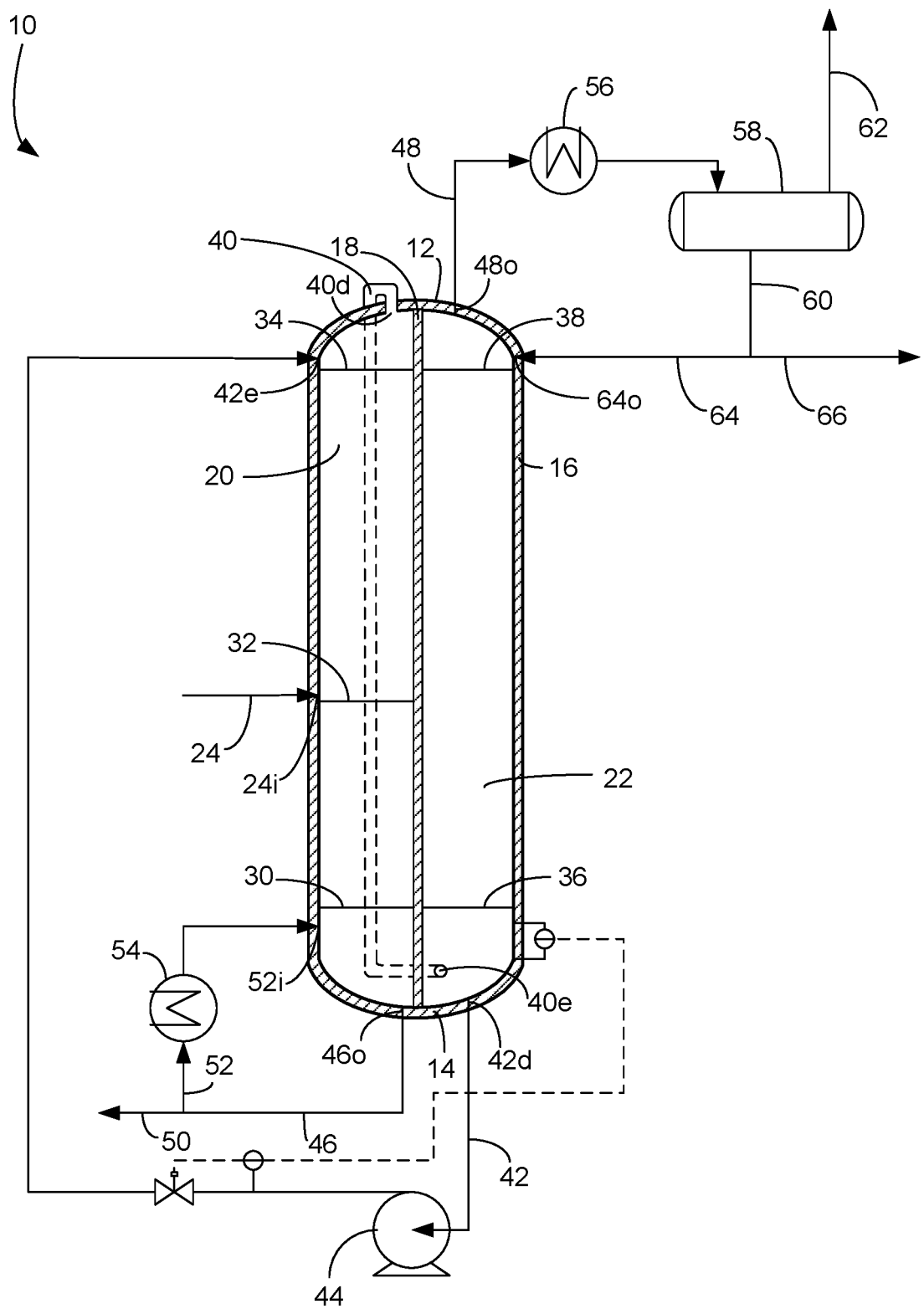

FOLDED FRACTIONATION COLUMN AND PROCESS

FIELD

The field relates to distillation in a fractionation column.

BACKGROUND

The recovery and purification of a desired compound from another compound in a mixture may be accomplished by a sequence of distillation operations. The sequence may consist of distillation columns to separate both lower and higher boiling components from the desired compounds and generally includes a distillation operation to separate a mixed stream of the desired compound from another compound closest to it in boiling point. Separating a desired olefin from its alkane to provide an olefin product or "polymer grade" olefin, which can be used for polymer manufacturing in a downstream operation can require many distillation stages. For example, the ethylene/ethane and propane/propylene separations by distillation are both energy and capital intensive due to the relative volatility of species to be separated, feed composition, and product purity requirements of "polymer grade" propylene.

Capital intensity is high because numerous trays are necessary to make the fine and difficult separation that polymer grade olefins require. Distillation columns of 150 trays are typical for a propylene/propane splitter column resulting in very tall columns. Ways are sought to reduce the height of these fractionation columns.

SUMMARY

An apparatus and process doubles the number of trays in a single fractionation column. A dividing wall is used to isolate a first side from a second side and fractionation on trays on each side is independent of the other. A transition vapor stream is ducted from a top of a first side to the bottom of the second side, and a transition liquid stream is ducted from a bottom of the second side to the top of the first side.

BRIEF DESCRIPTION OF THE DRAWING

The FIGURE is a simplified schematic diagram of a fractionation column.

DETAILED DESCRIPTION

The FIGURE schematically illustrates a fractionation column applicable to the separation of any two materials of different boiling points and are particularly useful for materials with a difference in boiling points of about 11° C. (~20° F.) or less. Non-limiting examples of separations suitable for the fractionation column 10 include: paraffin/olefin separations including ethane/ethylene, propane/propylene, butane/butylene, pentane/pentene; isomer/normal separations of these compounds (e.g., isobutane/butane); straight chain/branched or multi-chain paraffin separations; ethyl benzene/styrene; mixed xylenes separations (e.g., para/ortho/meta); and others.

Those skilled in the art and guided by the teachings herein provided will recognize and appreciate that the illustrated fractionation column 10 has been simplified by the elimination of various usual or customary pieces of process equipment including some heat exchangers, control systems, pumps, and the like. It may also be discerned that the process flows depicted in the FIGURE may be modified in many aspects without departing from the scope of this disclosure.

The fractionation column 10 comprises a top 12, a bottom 14 and a sidewall 16 extending between the top and bottom. The sidewall 16 may define a tube and is preferably cylindrical with a hollow interior. The side wall 16 is typically solid steel and may have an outer insulative layer. The top 12 and the bottom 14 may be hemi-spherical and be contiguous with the top and bottom of the sidewall 16, respectively. A dividing wall 18 extends longitudinally between the top 12 and the bottom 14 and laterally between sides of the sidewall 16, so as to divide a first side 20 of the column 10 from a second side 22 of the column. Suitably, the dividing wall 18 extends longitudinally completely between the top 12 and the bottom 14 and laterally completely between the first side 20 and the second side 22 of the column 10, so as to prevent material from traveling from the first side 20 to the second side 22 except through a duct or intentional opening. The first side 20 does not communicate with the second side 22 through the wall 18 except through a duct or intentional opening. As such, the first side 20 is isolated from the second side 22 by the dividing wall 18.

A feed stream comprising a first material having a lower boiling point and a second material having a higher boiling point than the first material to be separated by fractionation is introduced into the column 10 in a feed line 24 through a feed inlet 24$i$ in the side wall. The feed line 24 may feed the first side 20 through the feed inlet 24$i$ as shown in the FIGURE. However, the, feed line 24 may feed the feed stream to the second side 22. The fractionation column 10 receives the feed stream in line 24 and fractionates the first material from the second material in the feed stream by boiling the more volatile first material from the less volatile second material.

The column 10 contains numerous trays but only five trays are illustrated: the bottom tray 30, the feed tray 32, the first top tray 34, the second bottom tray 36 and the top tray 38. Numerous trays are provided between the first top tray 34 and the bottom tray 30 and between the second bottom tray 36 and the top tray 38 but are not shown. No trays are provided above the first top tray 34 or the top tray 38 or below the second bottom tray 36 and the bottom tray 30. The top 12 of the column 10 is above the first top tray 34 and the top tray 38. The bottom 14 of the column 10 is below the bottom tray 30 and the second bottom tray 36.

In the fractionation column 10 the feed stream is distilled causing more volatile materials to ascend in the column from tray to tray and less volatile materials to descend in the column from tray to tray on both sides 20, 22 of the column.

A vapor discharge 40$d$ is provided at the top 12 of the column 10, preferably in the top 12 of the column, in the first side 20 to emit vapor from the top 12 in the first side. The vapor discharge 40$d$ may be the only way vapor may exit the first side 20 or the top 12 of the first side of the column 10. The vapor discharge 40$d$ is preferably above the first top tray 34 in the first side 20. The vapor discharge 40$d$ feeds a vapor duct having a first end at the vapor discharge and a second end of the duct at a vapor entry 40$e$ at the bottom 14 of the column 10 in the second side 22. The duct 40 may extend through the column 10 such as through the dividing wall 18. It is also envisioned that the dividing wall is double walled defining the vapor duct 40 between the two walls with the vapor discharge 40$d$ comprising an opening in the wall on the first side 20 at the top 12 and the vapor entry 40$e$ comprising an opening in the wall on the second side 22 at the bottom 14 (not shown). The vapor entry 40$e$ is preferably below the second bottom tray 36 in the second side 22.

Preferably, the vapor duct 40 extends outside of the column 10, as shown in phantom, and the vapor discharge 40d and the vapor entry 40e are fashioned in the sidewall 16 or the top 12 or bottom 14 of the column, respectively. A transition vapor stream is passed in the duct 40 from the top 12 in the first side 20 of the column 10 to the bottom 14 in the second side 22 of the column to be further rectified in the second side.

The column 10 comprises a liquid discharge 42d at the bottom 14, preferably in the bottom, of the column in the second side 22. The liquid discharge 42d is preferably below the second bottom tray 36 in the second side 22. A liquid duct 42 has a first end at the liquid discharge 42d, and the liquid duct has a second end at a liquid entry 42e at or in the top 12 of the column 10 in the first side 20. The liquid entry 42e is preferably above the first top tray 34 in the first side 20. The liquid duct 42 may include a pump 44 for pumping the liquid up the liquid duct from the bottom 14 to the top 12 of the column 10. The liquid duct 42 extends from the suction side to the discharge side of the pump 44. The liquid duct 42 passes a transition liquid stream from the bottom 14 of the second side 22 of the column 10 to the top 12 of the first side 20 of the column to be further stripped in the first side.

The fractionation column 10 has a bottoms outlet 46o at the bottom 14, preferably in the bottom, of the column in the first side 20 and an overhead outlet 48o at the top 12, preferably in the top, of the column in the second side 22. The bottoms outlet 46o is preferably below the bottom tray 30 in the first side 20. A bottoms line 46 withdraws a bottoms liquid stream from the bottom 14 of the first side 20 of the column 10 through the bottoms outlet 46o. A bottoms product line 50 may take a portion of the bottoms liquid stream from the bottoms line 46 as bottoms product. The bottoms outlet 46o in the bottom 14 of the column 10 in the first side 20 may be in upstream communication with the bottoms product line 50. The bottoms product line 50 transports a bottoms product stream of the second material.

A reboil line 52 may take a reboil portion of the bottoms liquid stream in the bottoms line 46 to a reboil heater 54 to reboil the bottoms liquid and return the reboiled vapor to the column 10, perhaps to the bottom of the column through a reboil inlet 52i at, and preferably in, the bottom of the column in the first side 20. The reboil inlet 52i is preferably below the bottom tray 30 in the first side 20. The reboil heater 54 may be in downstream communication with the bottoms outlet 46o in the column 10, and a reboil inlet 52i in the first side 20 of the column, at or perhaps in the bottom of the column, may be in downstream communication with the reboil heater 54. In an alternative embodiment, no reboiler is used, and the bottoms product line 50 takes all of the bottoms liquid stream from the bottoms outlet as the bottoms product. Heat input to the column may be provided by preheating the feed stream in feed line 24 or by providing a vaporous media stream, such as steam, at or in the bottom 16 of the column 10 in the first side 20 or the second side 22.

An overhead line 48 is in downstream communication with the overhead outlet 48o in the top 12 of the column 10 in the second side 22 for removing an overhead vapor stream from the top 12 in the second side 22 of the column 10. The overhead outlet 48o is preferably above the top tray 38 in the second side 20.

A cooler 56 may be in downstream communication with the overhead outlet 48o to cool and condense at least part of the overhead vapor stream in the overhead line 48. A receiver 58 comprising a separator vessel may be in downstream communication with the overhead outlet 48o, the overhead line 48 and the cooler 56 for receiving the condensed vapor stream from the cooler 56. The condensed vapor stream separates in the receiver into a net vapor stream and a condensate stream. A net overhead vapor line 62 may extend from a top of the receiver 58 for transporting and recovering a net overhead vapor stream. The net overhead vapor line may be in downstream communication with the receiver 58. A condensate line 60 extends from a bottom of the receiver 58 for transporting an overhead condensate stream. A reflux inlet 64o in the top 12 of the column in the second side 22 may be in downstream communication with the overhead outlet 48o. The reflux inlet 64o is preferably above the top tray 38 in the second side 22. A reflux line 64 transports a reflux stream taken from the overhead condensate stream as a reflux portion of the overhead condensate stream in the condensate line 60 to the top 12 in the second side 22 of the column 10. The reflux inlet 64o may be in downstream communication with the reflux line 64. A net overhead liquid line 66 in downstream communication with the receiver 58 transports to recovery a net overhead liquid stream taken from the overhead condensate stream in the condensate line 60 comprising the first material.

In some cases, the receiver 58 may collect an aqueous stream from the condensed vapor stream which is recovered in an aqueous line perhaps coming off of a boot (not shown) from the receiver. Additionally, the net overhead vapor line 62 may be optional if the condenser 56 is operated to completely condense the overhead vapor stream from the overhead outlet 48o.

Operating conditions for a fractionation column are confined by the physical properties of the materials being separated in the column. Operating temperature and pressure of a column may be varied within these confines to minimize the operating cost of the column and accommodate other commercial objectives. The operating temperature may range from very low temperatures used in cryogenic separations to temperatures which challenge the thermal stability of the compounds. Conditions suitable for the subject process therefore include a temperature in the broad range of from about −50° C. to about 400° C. The column is operated at a pressure sufficient to maintain at least a portion of the feed compounds present as a liquid.

Any of the above conduits, unit, devices, vessels, scaffolding, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

A sensor on the liquid duct 42 may communicate data such as to a liquid level control in the bottom 14 of the second side 22 and to a flow meter on the liquid duct. The sensor may be a flow meter, a temperature sensor or a pressure gauge. The sensor may transmit or communicate data to an offsite location.

An embodiment relates to a fractionation system comprising at least one processor; at least one memory storing computer-executable instructions; and at least one receiver configured to receive data from a sensor an apparatus for fractionating a first material from a feed stream of the first material and a second material, the column comprising a column comprising a top, a bottom and a sidewall extending therebetween, a dividing wall extending between the top and the bottom and between sides of the sidewall so as to divide a first side of the column from a second side of the column; a feed inlet in the sidewall for introducing the feed stream into the column, a vapor discharge at the top of the column in the first side, a duct having a first end at the vapor discharge, a second end of the duct at a vapor entry at a bottom of the column in the second side; a liquid discharge at the bottom of the column in the second side, a duct having a first end at the liquid discharge, a second end of the duct at a liquid inlet at a top of the column in the first side; an bottoms outlet in the bottom of the column in the first side; and an overhead outlet in the top of the column in the second side. The system may further comprise an input/output device to collect the data. The processor may be configured to evaluate the data. The processor may be configured to correlate the data. The system may further comprise a transmitter to transmit a signal to the fractionation system. The signal may comprise instructions. The signal may be transmitted to the fractionation system. The system may further comprise comprising receiving data from multiple systems wherein one system is the fractionation system. The processor may be further configured to generate quantitative information, predictive information, liquid flow rate, or both. The turbine may comprise a sensor. The at least one receiver may be further configured to receive data of flow rate, temperature or pressure.

An embodiment relates to a method for collecting data from a fractionation column, the method comprising receiving data from a sensor on an apparatus for fractionating a first material from a feed stream of the first material and a second material, the column comprising a column comprising a top, a bottom and a sidewall extending therebetween, a dividing wall extending between the top and the bottom and between sides of the sidewall so as to divide a first side of the column from a second side of the column; a feed inlet in the sidewall for introducing the feed stream into the column, a vapor discharge at the top of the column in the first side, a duct having a first end at the vapor discharge, a second end of the duct at a vapor entry at a bottom of the column in the second side; a liquid discharge at the bottom of the column in the second side, a duct having a first end at the liquid discharge, a second end of the duct at a liquid inlet at a top of the column in the first side; an bottoms outlet in the bottom of the column in the first side; and an overhead outlet in the top of the column in the second side. The method may further comprise at least one of displaying, or transmitting, or analyzing the received data. The method may further comprise analyzing the received data to generate at least one instruction and transmitting the at least one instruction. The method may further comprise analyzing the received data and generating predictive information. The predictive information may comprise fractionation performance, flow rate data, temperature data or pressure data.

Specific Embodiments

While the following is described in conjunction with specific embodiments, it will be understood that this description is intended to illustrate and not limit the scope of the preceding description and the appended claims.

A first embodiment of the invention is an apparatus for fractionating a first material from a feed stream of the first material and a second material, the column comprising a column comprising a top, a bottom and a sidewall extending therebetween, a dividing wall extending between the top and the bottom and between sides of the sidewall so as to divide a first side of the column from a second side of the column; a feed inlet in the sidewall for introducing the feed stream into the column, a vapor discharge at the top of the column in the first side, a duct having a first end at the vapor discharge, a second end of the duct at a vapor entry at a bottom of the column in the second side; a liquid discharge at the bottom of the column in the second side, a duct having a first end at the liquid discharge, a second end of the duct at a liquid inlet at a top of the column in the first side; an bottoms outlet in the bottom of the column in the first side; and an overhead outlet in the top of the column in the second side. An embodiment of the invention is one, any or all of prior embodiments in this paragraph up through the first embodiment in this paragraph wherein the dividing wall extends all the way from the top to the bottom, so the first side does not communicate with the second side through the wall. An embodiment of the invention is one, any or all of prior embodiments in this paragraph up through the first embodiment in this paragraph wherein the bottoms outlet in the bottom of the column in the first side is in communication with a bottoms product outlet line. An embodiment of the invention is one, any or all of prior embodiments in this paragraph up through the first embodiment in this paragraph further comprising a reboiler heater in communication with the bottoms outlet in the bottom of the column and a reboil inlet in the bottom of the column on the first side in communication with the reboiler heater. An embodiment of the invention is one, any or all of prior embodiments in this paragraph up through the first embodiment in this paragraph wherein the overhead outlet in the top of the column in the second side is in communication with an overhead outlet line. An embodiment of the invention is one, any or all of prior embodiments in this paragraph up through the first embodiment in this paragraph further comprising a cooler in communication with the overhead outlet. An embodiment of the invention is one, any or all of prior embodiments in this paragraph up through the first embodiment in this paragraph further comprising a receiver in communication with the overhead outlet. An embodiment of the invention is one, any or all of prior embodiments in this paragraph up through the first embodiment in this paragraph further comprising a reflux inlet in the top of the column in the second side in communication with the overhead outlet. An embodiment of the invention is one, any or all of prior embodiments in this paragraph up through the first embodiment in this paragraph further comprising a net overhead liquid line in communication with the receiver. An embodiment of the invention is one, any or all of prior embodiments in this paragraph up through the first embodiment in this paragraph further comprising a net overhead vapor outlet line in communication with the receiver. An embodiment of the invention is one, any or all of prior embodiments in this paragraph up through the first embodiment in this paragraph further comprising pump in communication with the liquid discharge and the liquid inlet is in communication with the pump.

A second embodiment of the invention is a process comprising feeding the feed stream to a fractionation column; passing a transition vapor stream from a top of the first side of the column to a bottom of a second side of the column; passing a transition liquid stream from the bottom of the second side of the column to a top of the first side of the column; withdrawing an overhead vapor stream from a top of the second side of the column; and withdrawing a liquid stream from the bottom of the first side of the column. An embodiment of the invention is one, any or all of prior embodiments in this paragraph up through the second embodiment in this paragraph wherein the first side is isolated from the second side by a dividing wall. An embodiment of the invention is one, any or all of prior embodiments in this paragraph up through the second embodiment in this paragraph further comprising cooling the overhead vapor stream and separating a net vapor stream from a condensate stream. An embodiment of the invention is one, any or all of prior embodiments in this paragraph up through the second embodiment in this paragraph further comprising refluxing a reflux portion from the condensate stream to the top of the column and recovering a net liquid stream. An embodiment of the invention is one, any or all of prior embodiments in this paragraph up through the second embodiment in this paragraph further comprising reboiling a reboil portion of the liquid stream and returning the reboil portion to the bottom of the column. An embodiment of the invention is one, any or all of prior embodiments in this paragraph up through the second embodiment in this paragraph, further comprising sensing at least one parameter of the process and generating a signal or data from the sensing; and generating and transmitting a signal or data.

A third embodiment of the invention is an apparatus for fractionating a first material from a feed stream of the first material and a second material, the column comprising a column comprising a top, a bottom and a sidewall extending therebetween, a dividing wall extending all the way from the top to the bottom and between sides of the sidewall so as to divide a first side of the column from a second side of the column, so the first side does not communicate with the second side through the wall; a feed inlet in the sidewall for introducing the feed stream into the column, a vapor discharge at the top of the column in the first side, a duct having a first end at the vapor discharge, a second end of the duct at a vapor entry at a bottom of the column in the second side; a liquid discharge at the bottom of the column in the second side, a duct having a first end at the liquid discharge, a second end of the duct at a liquid inlet at a top of the column in the first side; an bottoms outlet in the bottom of the column on the first side; and an overhead outlet in the top of the column on the second side. An embodiment of the invention is one, any or all of prior embodiments in this paragraph up through the third embodiment in this paragraph further comprising a cooler in communication with the overhead outlet, a receiver in communication with the cooler, and a net overhead liquid outlet line in communication with the receiver. An embodiment of the invention is one, any or all of prior embodiments in this paragraph up through the third embodiment in this paragraph wherein the bottoms outlet in the bottom of the column in the first side is in communication with a bottoms product outlet line.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A fractionation system for fractionating a first material from a feed stream of the first material and a second material, the system comprising:
   a column comprising a top, a bottom and a sidewall extending therebetween;
   a dividing wall extending between the top and the bottom and between sides of the sidewall so as to divide a first side of the column from a second side of the column, each side of the column comprising a plurality of trays, wherein the first side comprises a first top tray and a first bottom tray, and the second side comprises a height between a second top tray and a second bottom tray;
   a feed inlet in the sidewall for introducing the feed stream into the column on the first side at a feed inlet tray, wherein the feed inlet tray is between the first top tray and the first bottom tray, such that the first side comprises a first rectifying section disposed above the feed inlet and a stripping section disposed below the feed inlet;
   a vapor discharge at the top of the column in the first side, a vapor duct having a first end at said vapor discharge, a second end of said vapor duct at a vapor entry at a bottom of the column in the second side, such that an entirety of the height of the second side comprises a second rectifying section, and wherein the second rectifying section is configured to operate at a lower temperature and pressure than the first rectifying section;
   a liquid discharge at the bottom of the column in the second side, a liquid duct having a first end at said liquid discharge, a second end of said liquid duct at a liquid inlet at a top of the column in the first side and above the feed inlet in the sidewall;
   a bottoms outlet in the bottom of the column in the first side, wherein a reboiler heater is in fluid communication with the bottoms outlet in the bottom of the column; and
   an overhead outlet in the top of the column in the second side, wherein a cooler is in fluid communication with the overhead outlet.

2. The fractionation system of claim 1 wherein said dividing wall extends all the way from the top to the bottom, so the first side is not in fluid communication with the second side through the dividing wall.

3. The fractionation system of claim 1 wherein the bottoms outlet in the bottom of the column in the first side is in fluid communication with a bottoms product outlet line.

4. The fractionation system of claim 3 further comprising a reboil inlet in the bottom of the column on the first side in fluid communication with the reboiler heater.

5. The fractionation system of claim 1 wherein the overhead outlet in the top of the column in the second side is in fluid communication with an overhead outlet line.

6. The fractionation system of claim 1 further comprising a receiver in fluid communication with the overhead outlet.

7. The fractionation system of claim 6 further comprising a reflux inlet in the top of the column in the second side in fluid communication with the overhead outlet.

8. The fractionation system of claim 7 further comprising a net overhead liquid line in fluid communication with said receiver.

9. The fractionation system of claim 7 further comprising a net overhead vapor outlet line in fluid communication with said receiver.

10. The fractionation system of claim 1 further comprising pump in fluid communication with said liquid discharge and said liquid inlet is in fluid communication with said pump.

11. A fractionation system for fractionating a first material from a feed stream of the first material and a second material, the system comprising:
 a column comprising a top, a bottom and a sidewall extending therebetween;
 a dividing wall extending all the way from the top to the bottom and between sides of the sidewall so as to divide a first side of the column from a second side of the column, each side of the column comprising a plurality of trays, wherein the first side comprises a first top tray and a first bottom tray, and the second side comprises a height between a second top tray and a second bottom tray;
 a feed inlet in the sidewall for introducing the feed stream into the column on the first side at a feed inlet tray, wherein the feed inlet tray is between the first top tray and the first bottom tray, such that the first side comprises a first rectifying section disposed above the feed inlet and a stripping section disposed below the feed inlet;
 a vapor discharge at the top of the column in the first side, an uninterrupted vapor duct having a first end at said vapor discharge, a second end of said uninterrupted vapor duct at a vapor entry at a bottom of the column in the second side, such that an entirety of the height of the second side comprises a rectifying section, and wherein the first side of the column is not in fluid communication with the second side of the column through the dividing wall except by said uninterrupted vapor duct which extends a distance greater than the height of the second side, through the column, and through the dividing wall;
 a liquid discharge at the bottom of the column in the second side, a liquid duct having a first end at said liquid discharge, a second end of said liquid duct at a liquid inlet at a top of the column in the first side;
 a bottoms outlet in the bottom of the column on the first side; and
 an overhead outlet in the top of the column on the second side.

12. The fractionation system of claim 11 further comprising a cooler in fluid communication with the overhead outlet, a receiver in fluid communication with the cooler, and a net overhead liquid outlet line in fluid communication with said receiver.

13. The fractionation system of claim 11 wherein the bottoms outlet in the bottom of the column in the first side is in fluid communication with a bottoms product outlet line.

* * * * *